Patented Aug. 18, 1931

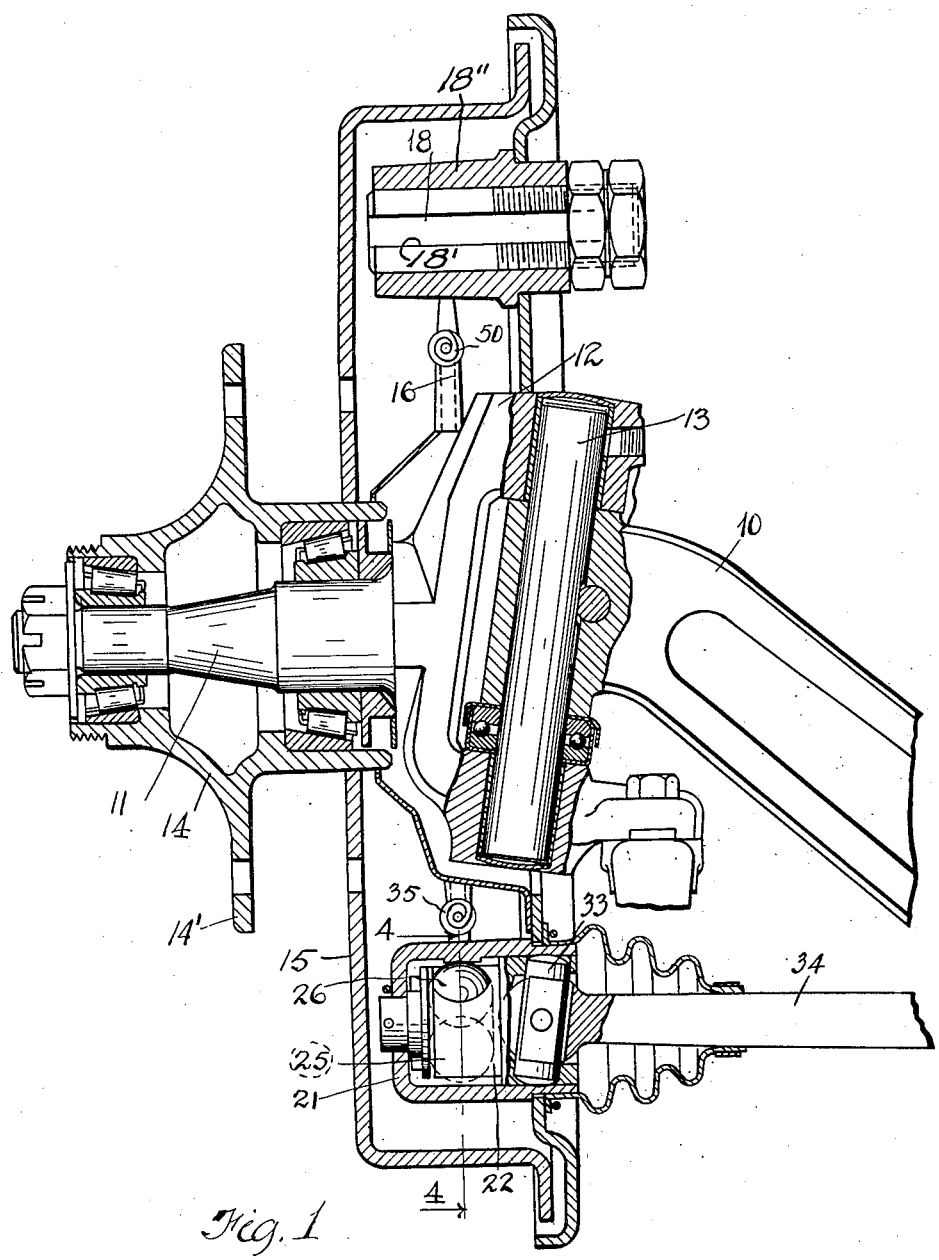

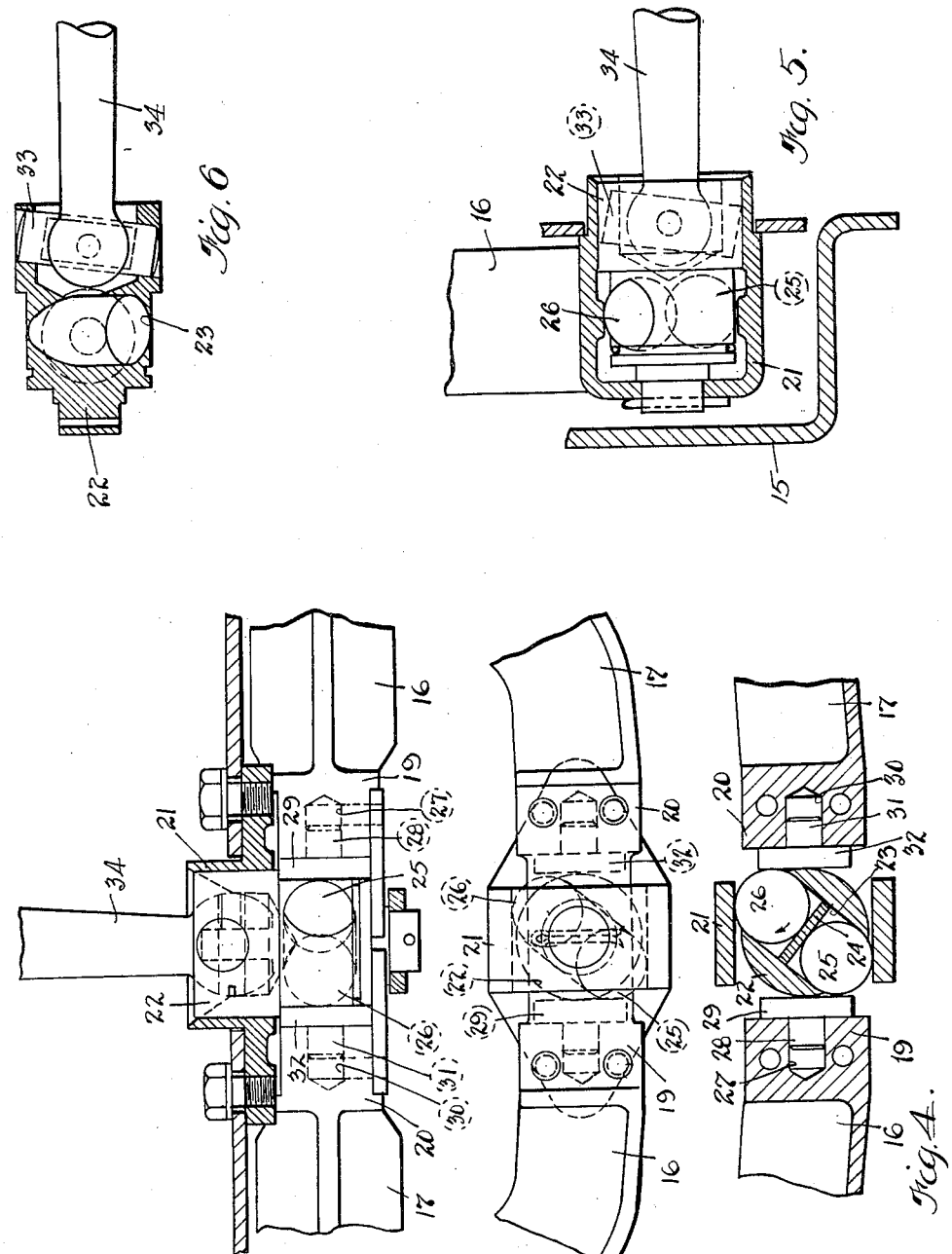

1,819,192

UNITED STATES PATENT OFFICE

LOUIS P. MOOERS, OF CLEVELAND, AND HERBERT W. FIES, OF CLEVELAND HEIGHTS, OHIO, ASSIGNORS TO THE COLUMBIA AXLE COMPANY, OF CLEVELAND, OHIO, A CORPORATION OF OHIO

BRAKE MECHANISM

Application filed September 15, 1928. Serial No. 306,128.

The present invention relates, as indicated, to brake mechanism, and more particularly to a novel cam for operating the shoes of internal expanding brakes. The primary object of the present invention is to provide such a cam which shall insure absolutely equal pressure of the respective shoes against the drum, and which shall be so constructed as to minimize the wear of the cam itself and wear of the plates on the end of the shoes. Further objects will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a vertical section through a brake drum and its associated elements; Fig. 2 is a horizontal section taken through such drum immediately above the operating cam; Fig. 3 is a front elevation of said cam and a portion of said brake shoes; Fig. 4 is a sectional view taken substantially on the line 4—4 of Fig. 1 and looking in the direction of the arrows; Fig. 5 is an enlarged view similar to Fig. 1, but showing only the operating cam and its adjacent parts; and Fig. 6 is a longitudinal sectional view through said operating cam.

Referring more particularly to the drawings, the reference numeral 10 indicates the usual front axle of an automotive vehicle, having secured thereto a spindle 11, by means of a knuckle 12 formed integrally with said spindle, and a king pin 13. The wheel hub 14 is rotatably mounted on said spindle 11 and is adapted to mount a wheel (not shown) between the flange 14' thereon and the brake drum 15 secured to said hub 14. Within said drum there are mounted a pair of shoes 16 and 17. One end of each of said shoes is supported in engagement with a member 18, said shoe ends being received in oppositely disposed cam grooves 18' in said member 18, whereby the distance between said ends of said shoes may be adjusted by reciprocating said member 18 through the medium of its threaded engagement with the support 18. A spring 50 urges said ends toward said member 18.

Between the opposite ends 19 and 20 of said shoes 16 and 17, respectively, there is secured a box frame 21 within which is journalled a cylindrical operating member 22. As is most clearly shown in Fig. 4, said member is formed with a bore 23, extending transversely of said member. In the embodiment shown, a disc 24 is mounted in said bore to act as a spacer between a pair of ball members 25 and 26, respectively. It is to be understood that disc 24 is not secured in said bore 23, but is floatably mounted therein, acting merely as a spacer between the ball members 25 and 26, while in no way interfering with the floating of said members longitudinally of the bore 23.

The end 19 of the shoe 16 is formed with a socket 27 adapted to receive a pin 28 formed on one face of a disc-like wear member 29. The fit of said pin 28 in said socket 27, while reasonably snug, is far from a driving fit, so that the disc 29 may easily rotate upon said pin 28 as a center. Similarly, the end 20 of the shoe 17 is formed with a socket 30 adapted to receive the pin 31 formed on one face of a similar disc-like member 32.

While it is not necessary to our invention, we prefer to mount the discs 29 and 32 in such a position that the balls 25 and 26 will not contact with the same on a center line thereof. Preferably the balls 25 and 26 will contact with said discs adjacent their edges, so that, at each actuation of the operating member 22, the balls 25 and 26 will tend to rotate the wear-plates 29 and 32 upon their axes 28 and 31, so that excessive wear of said plates will not take place in any one position.

A pin 33 is mounted in said operating member 22 on an axis parallel to that of the king pin 13, and to said pin there is pivotally connected an operating shaft 34. A resilient member 35 connecting the ends 19 and 20 of the shoes 16 and 17 urges said ends into contact with the operating member 22.

It will be seen that, when the shaft 34 is rotated, the operating member 22 is correspondingly rotated to bring the balls 25 and 26 into engagement with the discs 29 and 31 to cause the ends 19 and 20 of the shoes 16 and 17 to move apart, consequently bringing the surfaces of the shoes 16 and 17 into braking engagement with the internal surface of the brake drum 15. If the lining of the shoe 17, for instance, is slightly thicker than that of the shoe 16, the ball 26 will be moved slightly farther into the bore 23, while the ball 25 will be moved slightly farther out of said bore 23, thus equalizing the pressure of the two shoes upon the brake drum. Obviously, the provision of the ball members 25 and 26 in place of a solid member will reduce the amount of friction between the cam and the shoe ends, and consequently will reduce wear thereof. Of course, it is to be understood that, while the floatable mounting of the cam balls 25 and 26 is desirable, such mounting is not entirely essential to the present invention.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In an apparatus of the class described, the combination of a pair of brake shoes each having its one end anchored and its opposite end resiliently secured to the corresponding end of the other shoe, a wear-plate rotatably mounted on the last-named end of each of said shoes, and means interposed between said last-mentioned ends and adapted to cooperate with said wear-plates to cause separation of said ends, said means being mounted to engage with said wear plates only on lines removed from center lines of said plates.

2. In an apparatus of the class described, the combination of a pair of brake shoes each having its one end anchored and its opposite end resiliently secured to the corresponding end of the other shoe, a wear-plate loosely mounted on the last-named end of each of said shoes, and means interposed between said last-mentioned ends and adapted to cooperate with said wear-plates to cause separation of said ends.

3. In an apparatus of the class described, the combination of a pair of brake shoes each having its one end anchored and its opposite end resiliently secured to the corresponding end of the other shoe, a wear-plate loosely mounted on the last-named end of each of said shoes, and means interposed between said last-mentioned ends and adapted to cooperate with said wear-plates to cause rotation of said wear plates and separation of said ends.

4. In an apparatus of the class described, the combination of a pair of brake shoes each having its one end anchored and its opposite end resiliently secured to the corresponding end of the other shoe, a disc-like wear-plate loosely mounted on the last-named end of each of said shoes, and means interposed between said last-mentioned ends and adapted to cooperate with said wear plates to cause rotation of said wear plates and separation of said ends.

5. In an apparatus of the class described, the combination of a pair of brake shoes each having its one end anchored and its opposite end resiliently secured to the corresponding end of the other shoe, each of said last-mentioned ends being formed with a socket, a disc-like wear plate for each of said ends, a pin projecting from one face of each of said wear plates, said pins being mounted in said sockets, respectively, and means interposed between said last-mentioned ends and adapted to cooperate with said wear-plates to cause separation of said ends.

6. In an apparatus of the class described, the combination of a pair of brake shoes each having its one end anchored and its opposite end resiliently secured to the corresponding end of the other shoe, each of said last-mentioned ends being formed with a socket, a disc-like wear plate for each of said ends, a pin projecting from one face of each of said wear plates, said pins being rotatably mounted in said sockets, respectively, and means interposed between said last-mentioned ends and adapted to cooperate with said wear plates to cause rotation of said wear plates and separation of said ends.

7. In an apparatus of the class described, the combination of a pair of brake shoes each having its one end anchored and its opposite end resiliently secured to the corresponding end of the other shoe, a wear-plate loosely mounted on the last-named end of each of said shoes, and means interposed between said last-mentioned ends and adapted to cooperate with said wear-plates to cause separation of said ends, said means comprising a rotatable housing and a pair of ball members oppositely projecting from said housing.

8. In an aparatus of the class described, the combination of a pair of brake shoes each having its one end anchored and its opposite end resiliently secured to the corresponding end of the other shoe, a wear-plate loosely mounted on the last-named end of each of said shoes, and means interposed between said last-mentioned ends and adapted to cooperate with said wear-plates to cause separation of said ends, said means comprising a cylindrical housing rotatable on an axis perpendicular to the plane of said shoes and a pair of ball members mounted in said housing and projecting oppositely through the periphery thereof.

9. In an apparatus of the class described, the combination of a pair of brake shoes each having its one end anchored and its opposite end resiliently secured to the corresponding end of the other shoe, a disc-like wear-plate loosely mounted on the last-named end of each of said shoes, and means interposed between said last-mentioned ends and adapted to cooperate with said wear-plates to cause rotation of said wear-plates and separation of said ends, said means comprising a rotatable housing and a pair of ball members opositely projecting from said housing.

10. In an apparatus of the class described, the combination of a pair of brake shoes each having its one end anchored and its opposite end resiliently secured to the corresponding end of the other shoe, a disc-like wear plate loosely mounted on the last-named end of each of said shoes, and means interposed between said last-mentioned ends and adapted to cooperate with said wear-plates to cause rotation of said wear-plates and separation of said ends, said means comprising a cylindrical housing rotatable on an axis perpendicular to the plane of said shoes and a pair of ball members mounted in said housing and projecting oppositely through the periphery thereof.

11. In an apparatus of the class described, the combination of a pair of brake shoes each having its one end anchored and its opposite end resiliently secured to the corresponding end of the other shoe, a disc-like wear-plate loosely mounted on the last-named end of each of said shoes, and means interposed between said last-mentioned ends and adapted to cooperate with said wear-plates to cause rotation of said wear plates and separation of said ends, said means comprising a cylindrical housing rotatable on an axis perpendicular to the plane of said shoes, said housing being formed with a transverse bore, and a ball member mounted in said bore and projecting radially through the periphery of said housing.

12. In an apparatus of the class described, the combination of a pair of brake shoes each having its one end anchored and its opposite end resiliently secured to the corresponding end of the other shoe, a disc-like wear plate loosely mounted on the last-named end of each of said shoes, and means interposed between said last-mentioned ends and adapted to cooperate with said wear-plates to cause rotation of said wear-plates and separation of said ends, said means comprising a cylindrical housing rotatable on an axis perpendicular to the plane of said shoes, said housing being formed with a transverse bore, a spacer mounted in said bore substantially midway between the ends thereof, and a ball member mounted in said bore on each side of said spacer and projecting radially from said housing.

13. In an apparatus of the class described, the combination of a pair of brake shoes each having its one end anchored and its opposite end resiliently secured to the corresponding end of the other shoe, each of said last-mentioned ends being formed with a socket, a disc-like wear-plate for each of said ends, a pin projecting from one face of each of said wear-plates, said pins being rotatable mounted in said sockets, respectively, and means interposed between said last-mentioned ends and adapted to cooperate with said wear-plates to cause rotation of said wear-plates and separation of said ends, said means comprising a rotatable housing and a pair of ball members oppositely projecting from said housing.

14. In an apparatus of the class described, the combination of a pair of brake shoes each having its one end anchored and its opposite end resiliently secured to the corresponding end of the other shoe, each of said last-mentioned ends being formed with a socket, a disc-like wear plate for each of said ends, a pin projecting from one face of each of said wear-plates, said pins being rotatable mounted in said sockets, respectively, and means interposed between said last-mentioned ends and adapted to cooperate with said wear-plates to cause rotation of said wear-plates and separation of said ends, said means comprising a cylindrical housing rotatable on an axis perpendicular to the plane of said shoes, said housing being formed with a transverse bore, a spacer mounted in said bore substantially midway between the ends thereof, and a ball member mounted in said bore on each side of said spacer and projecting radially from said housing.

Signed by us this 13th day of September, 1928.

LOUIS P. MOOERS.
HERBERT W. FIES.